(12) United States Patent
Poissy

(10) Patent No.: US 9,346,698 B2
(45) Date of Patent: May 24, 2016

(54) PRECISION FORMING OF SHEET GLASS AND SHEET ROLLING APPARATUS

(71) Applicant: Corning Incorporated, Corning, NY (US)

(72) Inventor: Stephane Poissy, Brunoy (FR)

(73) Assignee: Corning Incorporated, Corning, NY (US)

(*) Notice: Subject to any disclaimer, the term of this patent is extended or adjusted under 35 U.S.C. 154(b) by 155 days.

(21) Appl. No.: 14/089,988

(22) Filed: Nov. 26, 2013

(65) Prior Publication Data

US 2014/0144181 A1 May 29, 2014

(30) Foreign Application Priority Data

Nov. 29, 2012 (EP) .................................... 12306484

(51) Int. Cl.
*C03B 13/16* (2006.01)
*C03B 13/04* (2006.01)
*C03B 17/06* (2006.01)

(52) U.S. Cl.
CPC .................. *C03B 13/16* (2013.01); *C03B 13/04* (2013.01); *C03B 17/06* (2013.01)

(58) Field of Classification Search
CPC ........ C03B 13/16; C03B 17/06; C03B 17/64; C03B 17/068
See application file for complete search history.

(56) References Cited

U.S. PATENT DOCUMENTS

| 3,486,879 A | 12/1969 | Allen ............................... 65/253 |
| 8,713,972 B2 | 5/2014 | Lakota et al. |
| 9,003,835 B2 | 4/2015 | Lock |
| 2009/0185835 A1 | 7/2009 | Park et al. ..................... 399/267 |

FOREIGN PATENT DOCUMENTS

| CN | 201704194 | 1/2011 |
| FR | 715635 | 12/1931 |
| GB | 347588 | 4/1931 |
| JP | 63089421 A * | 4/1988 |
| WO | 2012/166761 | 12/2012 |
| WO | 2013/082212 | 6/2013 |

OTHER PUBLICATIONS

English Translation of JP63089421 Performed by Phoenix Translations Sep. 2015.*
Machine translation of CN201704194.
Machine translation of JP1988089421.
(Continued)

*Primary Examiner* — Lisa Herring
(74) *Attorney, Agent, or Firm* — Jason A. Barron

(57) ABSTRACT

An apparatus (10) for forming sheet glass (78) includes a pair of rollers (12a, 12b) arranged in opposing relation to form a nip gap (38). At least one of the rollers (12a, 12b) is translatable to adjust a width (39) of the nip gap (38). A pair of spacer belts (34, 36) passes in between the pair of rollers (12a, 12b). The spacer belts (34, 36) are spaced apart along a length of the pair of rollers (12a, 12b) and have a thickness to set the width (39) of the nip gap (38). At least one actuator (42a, 42b) is coupled to at least one of the rollers (12a, 12b) and operable to adjust a width (39) of the nip gap (38) until the pair of spacer belts (34, 36) is gripped by the pair of rollers (12a, 12b) and the thickness of the pair of spacer belts (34, 36) sets the width (39) of the nip gap (38).

14 Claims, 8 Drawing Sheets

(56) References Cited

OTHER PUBLICATIONS

Database WPI, Week 198822, XP002694952, Thomson Scientific, London, GB, AN 1988-150033, Apr. 20, 1988.

EP12306484.2 Search Report Dated Apr. 23, 2013.
PCT/US2013/072008 IPRP Dated Jun. 11, 2015.
PCT/US2013/072008 Search Report Dated Feb. 19, 2014.

* cited by examiner

PRECISION FORMING OF SHEET GLASS AND SHEET ROLLING APPARATUS

CROSS-REFERENCE TO RELATED APPLICATIONS

This application claims the benefit of priority under 35 U.S.C. §119 of European Patent Application Serial No. 12306484.2, filed on Nov. 29, 2012, the content of which is relied upon and incorporated herein by reference in its entirety.

FIELD

The present disclosure relates generally to forming of sheet glass by rolling. More specifically, the present disclosure relates to setting of a nip gap formed by a pair of rollers.

BACKGROUND

Passing a stream or ribbon of molten glass through a nip gap formed by a pair of rollers is one of the oldest methods of producing sheet glass. The thickness of the rolled sheet glass is determined by the nip gap, which means that any variations in the width of the nip gap as the rollers rotate will be transferred to the thickness of the rolled sheet glass. Typically, collars mounted in recesses in the rollers are used to set the nip gap between the rollers. The collars on one roller are pressed against the collars on the other roller to set the nip gap. Variability of the nip gap is influenced by the dimensional accuracy of the rollers, collars, and recesses in which the collars are mounted.

SUMMARY

The present disclosure describes an apparatus for forming a sheet glass. In one aspect, the apparatus includes a pair of rollers arranged in opposing relation to form a nip gap. At least one of the rollers is translatable to adjust a width of the nip gap. The apparatus includes a pair of spacer belts passing in between the pair of rollers. The pair of spacer belts is spaced apart along a length of the pair of rollers and has a thickness to set the width of the nip gap. At least one actuator is coupled to at least one of the rollers and is operable to adjust the width of nip gap until the pair of spacer belts is gripped by the pair of rollers and the thickness of the pair of spacer belts sets the width of the nip gap.

In one embodiment, the apparatus further includes a belt guide disposed adjacent to at least one of the rollers. At least one of the spacer belts passes around one of the rollers and the belt guide.

In one embodiment, the belt guide includes a pair of pulleys, where each of the spacer belts passes around one of the rollers and one of the pulleys.

In another embodiment, the belt guide includes an auxiliary roller, where the pair of spacer belts passes around one of the rollers and the auxiliary roller.

In yet another embodiment, the belt guide includes a pair of guide blocks and a set of needle rollers attached to each of the guide blocks, where each of the spacer belts passes around one of the rollers and the set of needle rollers attached to one of the guide blocks.

In one embodiment, the set of needle rollers on each guide blocks is arranged in an arc or circular path on the guide block.

In one embodiment, the thickness of the pair of spacer belts is in a range from 0.1 mm to 4 mm.

In one embodiment, the thickness of the pair of spacer belts is 1 mm or less.

In one embodiment, the thickness of the pair of spacer belts is uniform.

In one embodiment, the thickness of the pair of spacer belts is profiled.

In one embodiment, the pair of spacer belts is made of a metal or an alloy.

In one embodiment, the apparatus further includes a pair of motors coupled to the pair of rollers for selectively rotating the rollers.

In one embodiment, the apparatus further includes a delivery vessel positioned to deliver molten material to the nip gap.

The present disclosure also describes a method of forming a sheet glass. In one aspect, the method includes arranging a pair of rollers in opposing relation to form a nip gap. The method includes passing a pair of spacer belts between the pair of rollers. The passing includes spacing the pair of spacer belts apart along a length of the pair of rollers. The method includes translating at least one of the pair of rollers to adjust a width of the nip gap until the pair of spacer belts is gripped by the pair of rollers and the width of the nip gap is set by a thickness of the pair of spacer belts. The method includes rotating at least one of the rollers. The method further includes delivering molten glass to the nip gap having the width set by the pair of spacer belts to form the sheet glass.

In one embodiment, the passing of the pair of spacer belts comprises passing at least one of the spacer belts around one of the rollers and a belt guide disposed adjacent to the one of the rollers.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
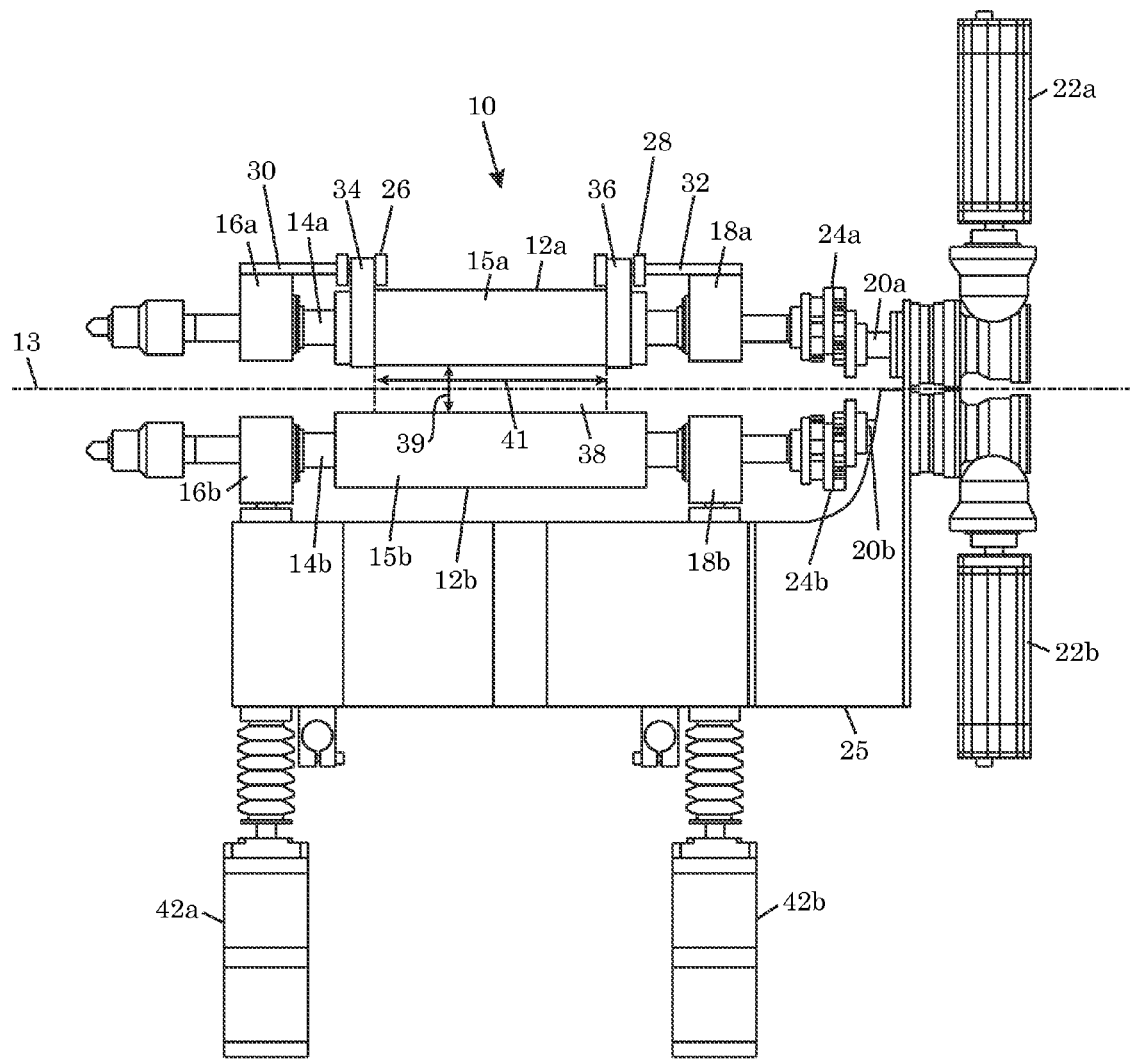
FIG. 1 shows a sheet rolling apparatus in an open position.

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements.

FIG. 1 shows a sheet rolling apparatus 10 that can receive a stream or ribbon of molten material and form the molten material into a sheet material with a select thickness and width. In various embodiments, the molten material is molten glass and the sheet material formed by rolling is sheet glass. The term "glass" is intended to cover glass or other material containing glass, such as a glass-ceramic material. The rolling apparatus 10 includes a pair of rollers 12a, 12b arranged in parallel and on opposite sides of a reference axis 13. The rollers 12a, 12b may or may not be equidistant from the reference axis 13. The axial axes of the rollers 12a, 12b are parallel to the reference axis 13. In one or more embodiments, the rollers 12a, 12b have circular cross-sections and cylindrical rolling surfaces 15a, 15b, which may be smooth to form a smooth sheet glass or may incorporate embossing textures to form an embossed sheet glass. The rollers 12a, 12b are mounted on and rotatable with roller shafts 14a, 14b. The roller shaft 14a extends through bearing blocks 16a, 18a arranged near distal ends of the roller 12a and is supported for rotation by bearings in the bearing blocks 16a, 18a. Also, the roller shaft 14b extends through bearing blocks 16b, 18b arranged near distal ends of the roller 12b and is supported for rotation by bearings in the bearing blocks 16b, 18b.

The roller shafts 14a, 14b are coupled to drive motor shafts 20a, 20b of drive motors 22a, 22b by shaft couplings 24a, 24b. In some embodiments, the shaft couplings 24a, 24b are offset couplings, such as Schmidt Offset Couplings, which are capable of compensating for parallel shift between the roller shafts 14a, 14b and the drive motor shafts 20a, 20b while transmitting torque and speed. With the offset couplings, it is not necessary for the drive motor shafts 20a, 20b to be axially aligned with the roller shafts 14a, 14b. In some embodiments, the offset couplings will allow the drive motors 22a, 22b to be fixed to a support frame 25 while the rollers 12a, 12b can be translated relative to the support frame 25. Alternatively, in other embodiments, the drive motor shafts 20a, 20b may be coupled to the roller shafts 14a, 14b via inline couplings. In these other embodiments, the positions of the drive motors 22a, 22b and rollers 12a, 12b would need to be coordinated such that the roller shafts 14a, 14b and drive motor shafts 20a, 20b are axially aligned.

Pulleys 26, 28 are positioned adjacent to and at a distance from the roller 12a. The axial axes of the pulleys 26, 28 are parallel to the reference axis 13 or to the axial axis of the roller 12a. The pulleys 26, 28 are mounted on pulley shafts 30, 32 in a manner that allows them to rotate freely on the pulley shafts 30, 32. The pulley shafts 30, 32 are attached at one end to the bearing blocks 16a, 18a, which allows the relationship between the pulleys 26, 28 and the roller 12a to be maintained through any translational motion of the roller 12a.

A pair of spacer belts 34, 36 is mounted on the roller 12a and spaced apart along the length of the roller 12a. The spacing between the spacer belts 34, 36 will need to be equal to or greater than the width of the sheet material to be rolled. Typically, the spacer belts 34, 36 will be identical in thickness but may or may not be identical in width. The thickness of the spacer belts 34, 36 will be determined by the thickness of the sheet material to be rolled. The spacer belts 34, 36 are endless belts and pass around the roller 12a and the pulleys 26, 28. The pulleys 26, 28 may have grooves to receive the spacer belts 34, 36. In some embodiments, the spacer belts 34, 36 are also seamless.

The spacer belts 34, 36 will typically be made of a relatively hard or stiff material such as a metal or an alloy. Unmounted, the spacer belts 34, 36 may have a circular shape or oval shape or other continuous loop shape. The spacer belts 34, 36 can be easily installed by passing them over the bearing block 16a and onto the roller 12a and pulleys 26, 28. The spacer belts 34, 36 can be temporarily deformed to a shape that would allow them to be slipped onto the pulleys 26, 28. Such temporary shape would have a span that is larger than the distance between the roller 12a and the pulleys 26, 28 so that the spacer belts 34, 36 can be pulled onto the pulleys 26, 28. The reverse of this process can be used to remove the spacer belts 34, 36 from the roller 12a and pulleys 26, 28. Thus the spacer belts 34, 36 can be mounted on and dismounted from the roller 12a and pulleys 26, 28 without having to remove the roller 12a from the bearing blocks 16a, 18a, which is a possible advantage over collars that must engage circumferential recesses in rollers.

The pulleys 26, 28 form a belt guide. In an alternate embodiment, another belt guide not made of pulleys may be arranged adjacent to the roller 12a, with the spacer belts 34, 36 passing over the alternate belt guide in the same manner explained for the pulleys 26, 28.

Figure 2:
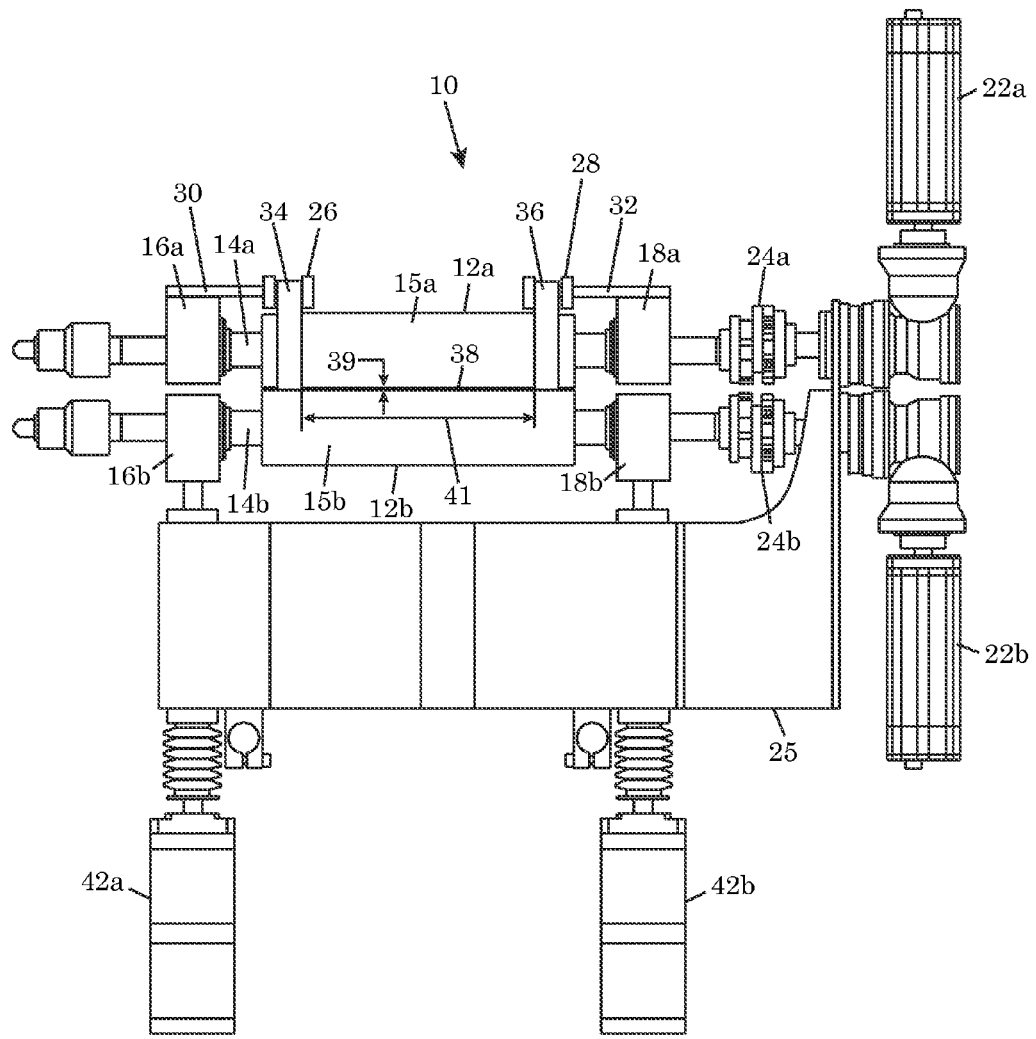
FIG. 2 shows the sheet rolling apparatus of FIG. 1 in a closed position.

The rollers 12a, 12b have an open position where they are not closed against the spacer belts 34, 36, as shown in FIG. 1. In this open position, both of the rollers 12a, 12b are not in contact with both of the spacer belts 34, 36. In the particular configuration shown in FIG. 1, only the roller 12a is in contact with the spacer belts 34, 36. The rollers 12a, 12b have a closed position where they are closed against the spacer belts 34, 36, as shown in FIG. 2. In the closed position, both of the rollers 12a, 12b are in contact with the spacer belts 34, 36. The contact between the rollers 12a, 12b and spacer belts 34, 36 is such that the spacer belts 34, 36 are pinched or gripped between the rollers 12a, 12b.

The rollers 12a, 12b form a nip gap 38 (see FIGS. 1 and 2), which is essentially a constriction. The width 39 of the nip gap 38 is the distance between the rollers 12a, 12b measured transverse to the axial centerlines of the rollers 12a, 12b. In the closed position, the width 39 of the nip gap 38 is determined by the thickness of the spacer belts 34, 36 in between the rollers 12a, 12b. The length 41 of the nip gap 38 is measured along the length of the pair of rollers 12a, 12b or along the reference axis 13. When the spacer belts 34, 36 are mounted on the roller 12a or are passing between the rollers 12a, 12b, the length 41 of the nip gap 38 is determined by the spacing between the spacer belts 34, 36 along the length of the pair of rollers 12a, 12b or along the reference axis 13.

To form a sheet material having a select thickness and width, the rollers 12a, 12b are moved to the closed position where the width of the nip gap 38 is set by the spacer belts 34, 36. Then, the drive motors 22a, 22b are operated to rotate the rollers 12a, 12b in opposing directions, and typically at the same speed. In alternate embodiments, only one of the drive motors may be operated to rotate its respective roller while the other roller is held fixed. The spacer belts 34, 36 will move around the roller 12a and pulleys 26, 28 as the rollers 12a, 12b are rotated. The motion of the spacer belts 34, 36 may result in rotation of the pulleys 36, 38 on the pulley shafts 30, 32. With the rollers 12a, 12b in the closed position and rotating, a stream or ribbon of molten material can be delivered to the nip gap 38. The rotating rollers 12a, 12b will pull the molten material through the nip gap 38 to form the sheet material. In some embodiments, the width of the stream or ribbon of molten material delivered to the nip gap 38 is smaller than the nip gap length 41 so that contact of the molten material with the spacer belts 34, 36 can be substantially avoided. In other embodiments, the width of the stream or ribbon of molten material may be the same as the nip gap length 41, which may allow contact of the molten material with the spacer belts 34, 36.

While the rollers 12a, 12b are biased against the spacer belts 34, 36, the nip gap 38 is set by the thickness of the pair of spacer belts 34, 36 in between the rollers 12a, 12b and the spacing between the spacer belts 34, 36. (When the term "thickness of the pair of spacer belts" is used with respect to defining a nip gap, it means the thickness of any one of the spacer belts in the pair or the representative thickness of the spacer belts in the pair when the spacer belts are arranged in a spaced-apart relation, as shown for spacer belts 34, 36 in FIGS. 1 and 2). The nip gap width 39 is determined by the thickness of the spacer belts 34, 36 between the rollers 12a, 12b. The precision of the nip gap 38 is a function of the straightness accuracy of the rollers 12a, 12b and the thickness accuracy of the spacer belts 34, 36. The roundness accuracy of the rollers 12a, 12b does not affect the precision of the nip gap 38. Thus the chain of dimension that defines the nip gap 38 formed by the spacer belts 34, 36 is relatively short. In comparison, for collars mounted in recesses, the precision of the nip gap width is a function of the straightness accuracy and roundness accuracy of the rollers, the roundness accuracy and depth accuracy of the recesses formed in the rollers, and the roundness accuracy and thickness accuracy of the collars mounted in the recesses.

In the system described above where spacer belts 34, 36 passed between rollers 12a, 12b are used to set the nip gap 38, if the rollers 12a, 12b are "perfect," the thickness of the sheet material will be the image of the thickness of the spacer belts 34, 36. To form a precision sheet material, in some embodiments, the straightness accuracy of each roller 12a, 12b, i.e., the straightness variation of each roller across a length of the roller, is within ±0.025 mm, preferably within ±0.01 mm. Further, in some embodiments, the thickness accuracy of each spacer belt 34, 36, i.e., the thickness variation of each spacer belt across the width of the spacer belt, is within ±0.025 mm, preferably within ±0.01 mm, more preferably within ±0.005 mm. Spacer belts 34, 36 having a thickness accuracy such as described above can be sourced from standard seamless endless belt suppliers or can be machined using standard turning methods.

Spacer belts 34, 36 and rollers 12a, 12b with thickness accuracy and straightness accuracy such as described above can be used for forming precision sheet glass by rolling. In some embodiments, the rolled sheet glass is a "precision sheet glass" if the thickness accuracy of the sheet glass, i.e., the thickness variation of the sheet glass across the width of the sheet glass, is within ±0.025 mm. It should be noted that "thickness" may be uniform or non-uniform. The variation that should be within a certain amount would be relative to the desired thickness profile.

Figure 3A:
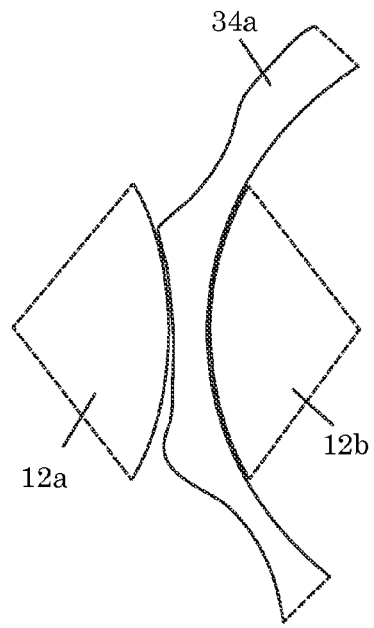
FIG. 3A shows a profiled spacer belt between a pair of rollers.
Figure 3B:
FIGS. 3B and 3C show sheet thickness profiles formed by the profiled spacer belt of FIG. 3A.
Figure 3C:
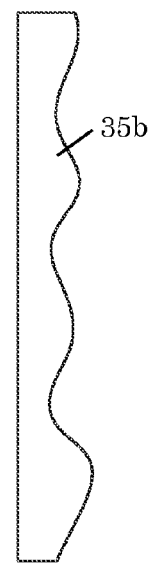
Figure 4A:
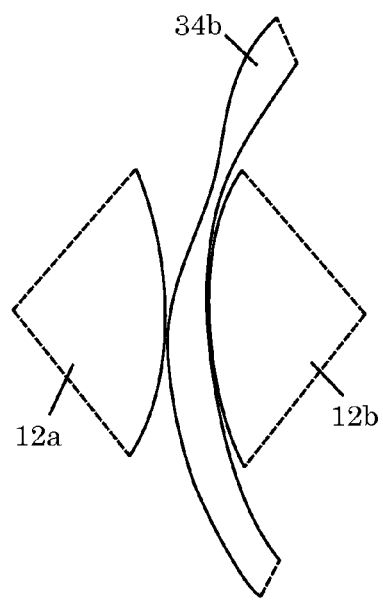
FIG. 4A shows a profiled spacer belt between a pair of rollers.
Figure 4B:
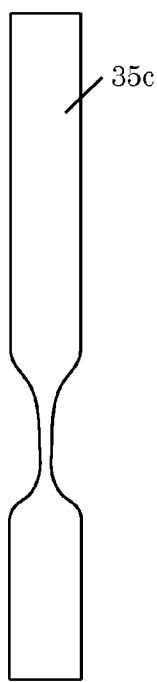
FIGS. 4B and 4C show sheet thickness profiles formed by the profiled spacer belt of FIG. 4A.
Figure 4C:
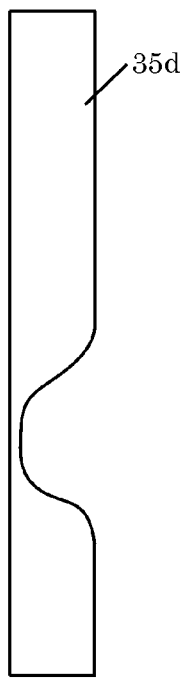

The spacer belts 34, 36 may have a uniform thickness or may have a profiled thickness. A profiled thickness means that the thickness of the spacer belts 34, 36 changes along the circumference of the belts and follows a select profile. Spacer belts having a profiled thickness can be used to produce profiled sheet glass. FIG. 3A shows an example spacer belt 34a with a profiled thickness in between rollers 12a, 12b. FIGS. 3B and 3C show sheet thickness profiles 35a, 35b that may be formed with the spacer belt 34a. FIG. 4A shows an example spacer belt 34b with a profiled thickness in between rollers 12a, 12b. FIGS. 4B and 4C show sheet thickness profiles 35c, 35d that may be formed with the spacer belt 34b. The symmetrical sheet thickness profiles shown in FIGS. 3B and 4B are formed by rotating both rollers symmetrically so that the molten material flows along a fixed vertical axis. The asymmetrical sheet thickness profiles shown in FIGS. 3C and 4C are formed by holding one roller fixed while rotating the other roller.

Returning to FIGS. 1 and 2, the thickness of the spacer belts 34, 36 will generally be dictated by the desired thickness of the sheet material. In some embodiments, the rolling apparatus 10 is used to form sheet glass and the thickness of the spacer belts 34, 36 is in a range from 0.1 mm to 4 mm, from 0.2 mm to 3 mm, or from 0.5 mm to 1 mm. The width of each of the spacer belts 34, 36 need only suffice to provide a reliable gap structure between the rollers 12a, 12b. In some embodiments, the width of the spacer belts 34, 36 can be in a range from 5 mm to 50 mm or from 5 mm to 40 mm. As mentioned earlier, the widths of the spacer belts 34, 36 may or may not be the same. The thickness and width guidelines described above may be used for uniform thickness or profiled thickness spacer belts.

The rollers 12a, 12b in FIGS. 1 and 2 are preferably made of a material that can withstand a high temperature without physical or chemical degradation. In general, the high temperature that must be withstood by the material of the rollers 12a, 12b will depend on the temperature at which the rollers 12a, 12b are maintained during a rolling process. For example, in some embodiments, molten material at temperatures from 1000 to 1500° C. is delivered to the nip gap 38 while the rollers 12a, 12b are maintained at temperatures below 700° C. In these embodiments, the material of the rollers 12a, 12b may be one that can withstand a high temperature of about 700° C. without physical or chemical degradation.

For forming sheet glass, the rollers 12a, 12b are preferably made of a material that will not react with glass at high temperatures that would be encountered during roll forming. In some embodiments, the rollers 12a, 12b may be made of stainless steel or other high temperature alloy that will not react with glass at high temperatures. It should be noted that the rollers 12a, 12b may also have internal chambers for circulating cooling fluid, e.g., to keep the rollers 12a, 12b at a lower temperature than that of the molten material delivered to the nip gap 38. Such cooling circulation may be used to reduce temperature gradients across the molten material delivered to the nip gap 38 and thereby reduce thermally-induced thickness variability of the rolled sheet material.

The spacer belts 34, 36 are preferably made of a material that can withstand a high temperature. However, the temperature requirement of the spacer belts 34, 36 can be somewhat relaxed compared to that of the rollers 12a, 12b. This is because the spacer belts 34, 36 do not need to contact the molten material during roll forming. In some embodiments, the spacer belts 34, 36 are made of a material that can withstand temperatures up to 500° C. without physical or chemical degradation. In various embodiments, the spacer belts 34, 36 are made of a hard or stiff material, typically a metal or an alloy. The hardness or stiffness of the material may be similar to that of the rollers 12a, 12b to avoid significant deformation of the spacer belts 34, 36 when pinched or gripped in between the rollers 12a, 12b. Examples of suitable materials for the spacer belts 34, 36 are steel and INCONEL® alloys (i.e., nickel-chromium-based alloys).

The pulleys 26, 28 may be made of the same material as the spacer belts 34, 36. In some cases, the pulleys 26, 28 may be made of a material that is not necessarily as hard as the material of the spacer belts 34, 36. In other cases, it is not necessary for the pulleys 26, 28 to withstand as high a temperature as either of the spacer belts 34, 36 or the rollers 12a, 12b.

Any suitable actuator system can be used to move the rollers 12a, 12b between the open and closed positions. In the closed position, the actuator system can push the rollers 12a, 12b against the spacer belts 34, 36 such that the spacer belts 34, 36 are pinched or gripped in between the rollers 12a, 12b, and thereby set the width of the nip gap 38. The actuator system may incorporate linear, rotary, or a combination of linear and rotary actuators.

FIG. 1 shows an actuator 42a coupled to the bearing blocks 16a, 16b. The manner of coupling the actuator 42a is such that the actuator 42a is operable to create opposed motions of the bearing blocks 16a, 16b that will move the rollers 12a, 12b between the open and closed positions. An actuator 42b coupled to the bearing blocks 18a, 18b is also shown in FIG. 1. The manner of coupling the actuator 42b is such that the actuator 42b is operable to create opposed motions of the bearing blocks 18a, 18b. The two actuators 42a, 42b will allow balanced or symmetric motion of the rollers 12a, 12b between the open and closed positions. In some embodiments, the actuators 42a, 42b are linear actuators. In particular embodiments, the actuators 42a, 42b are fluid powered cylinders, such as pneumatic cylinders.

Figure 5:
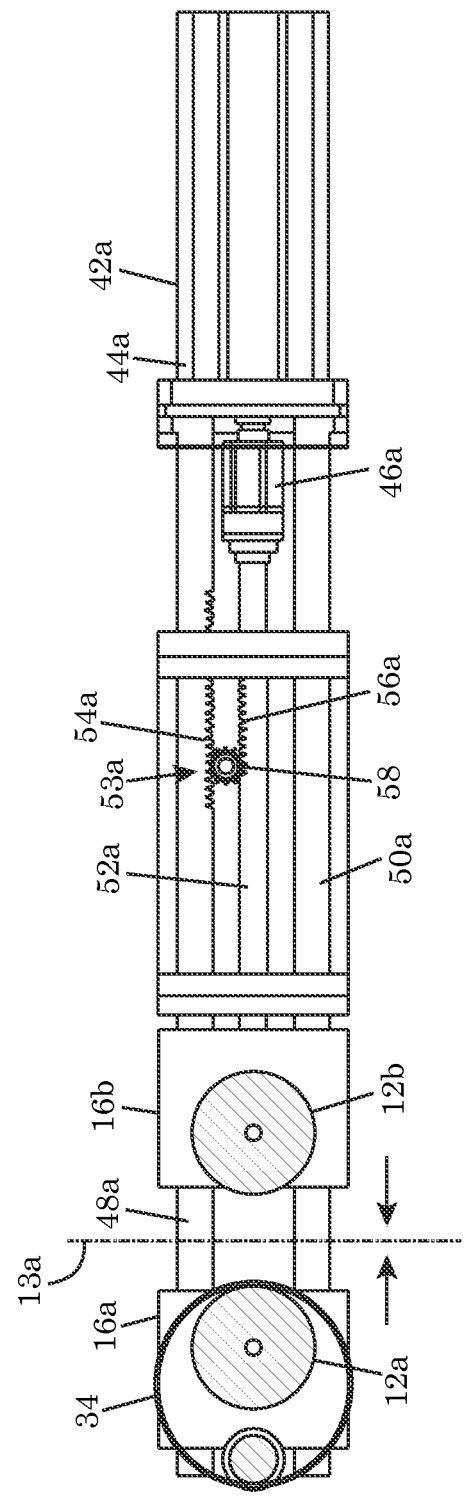
FIG. 5 shows an actuator system for moving the rollers of the sheet rolling apparatus of FIG. 1 between open and closed positions.

In FIG. 5, a body member 44a of the actuator 42a is coupled to the bearing block 16a by upper and lower guide shafts 48a, 50a. If the actuator 42a is a fluid powered cylinder, for example, the body member 44a may be the cylinder of the device. The upper and lower guide shafts 48a, 50a pass through openings in the bearing block 16b to reach the bearing block 16a. This allows the bearing block 16b to be slidable on and guided by the upper and lower guide shafts 48a, 50a. A slidable member 46a of the actuator 42a is coupled to the bearing block 18a by a middle shaft 52a. If the actuator 42a is a fluid powered cylinder, the slidable member 46a may be the piston rod of the device. A similar arrangement of upper, middle, and lower shafts is provided between the actuator 42b (in FIG. 1) and the bearing blocks 16b, 18b (in FIG. 1).

The upper and middle guide shafts 48a, 52a are coupled together by a rack and pinion mechanism 53a. In one or more embodiments, the rack and pinion mechanism 53a includes racks 54a, 56a, which are formed on the upper and middle shafts 48a, 52a. In between the racks 54a, 56b is a pinion 58. The rack and pinion mechanism 53a allows motion of the bearing blocks 16a, 16b to be synchronized. Relative to the drawing of FIG. 5, extension of the slidable member 46a in the left direction, i.e., towards the bearing blocks 16a, 16b, will cause the middle shaft 52a and rack 56a to move in the left direction. This will apply rotational motion to the pinion 58 that will cause the upper shaft 48a and rack 56a to move in the right direction, i.e., towards the actuator 42a. As the middle shaft 52a moves in the left direction, the bearing block 16b moves to the left and towards the reference axis 13a. As the upper shaft 48a moves in the right direction, the bearing block 16a moves to the right and towards the reference axis 13a. Retraction of the slidable member 46a in the right direction will result in the bearing blocks 16a moving in opposing directions and away from the reference axis 13a. A similar rack and pinion mechanism can be incorporated in the guide shafts coupling the actuator 42b (in FIG. 1) to the bearing blocks 16b, 18b (in FIG. 1) and will work in the same manner as explained above.

Various modifications to the rolling apparatus 10 of FIGS. 1 and 2 are possible. For example, it is not necessary to translate both rollers 12a, 12b between the open and closed positions. One roller could be held translationally fixed while the other roller is translated to place the rollers 12a, 12b between the open and closed positions.

Figure 6A:
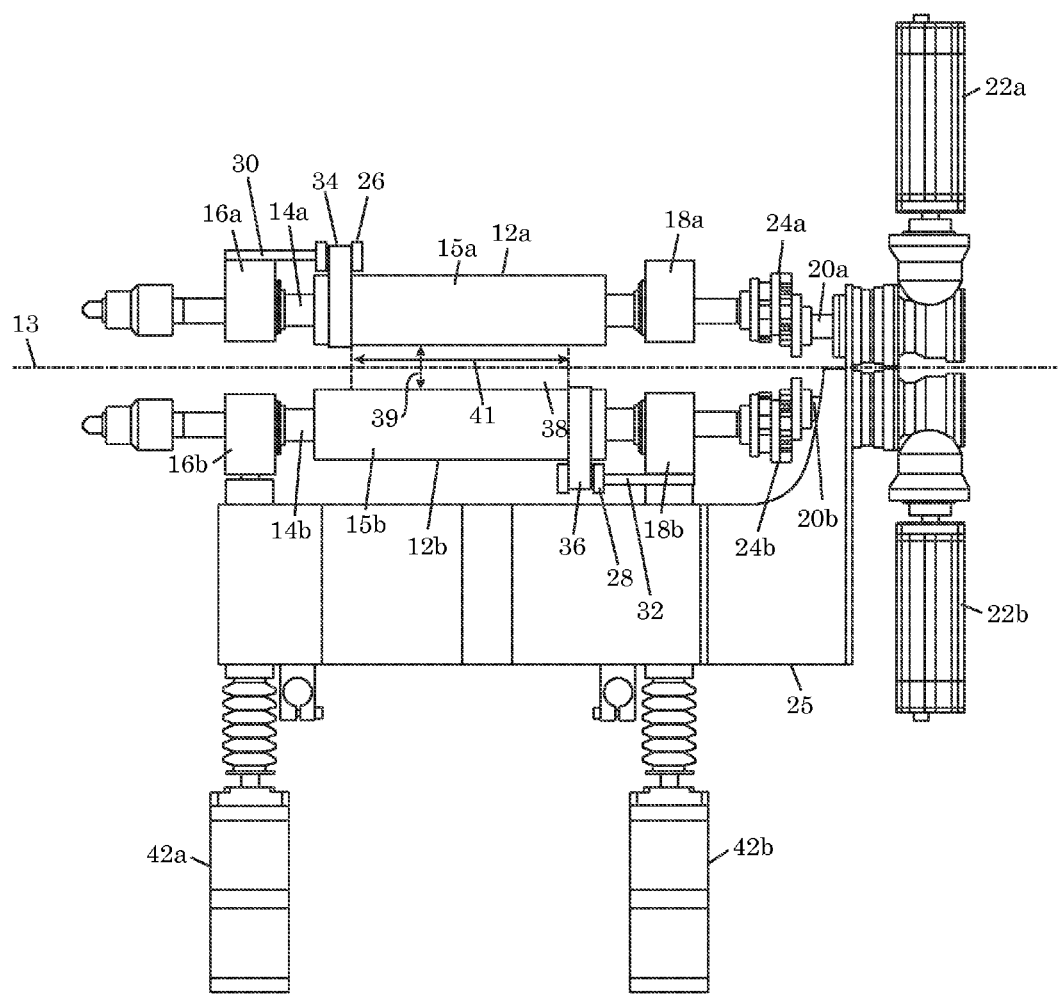
FIG. 6A shows a pair of spacer belts passing around a pair of rollers.

Another possible modification is shown in FIG. 6A, where the spacer belt 34 is passed around the roller 12a and pulley 26 and the spacer belt 36 is passed around the roller 12b and pulley 28. In this modification, the pulley 28 has been relocated to a position adjacent to the roller 12b, with the pulley shaft 32 attached to the bearing block 18b. The width 39 of the nip gap 38 will be set when the rollers 12a, 12b are biased against the spacer belts 34, 36 in the same manner as described above with reference to FIG. 2.

Figure 6B:
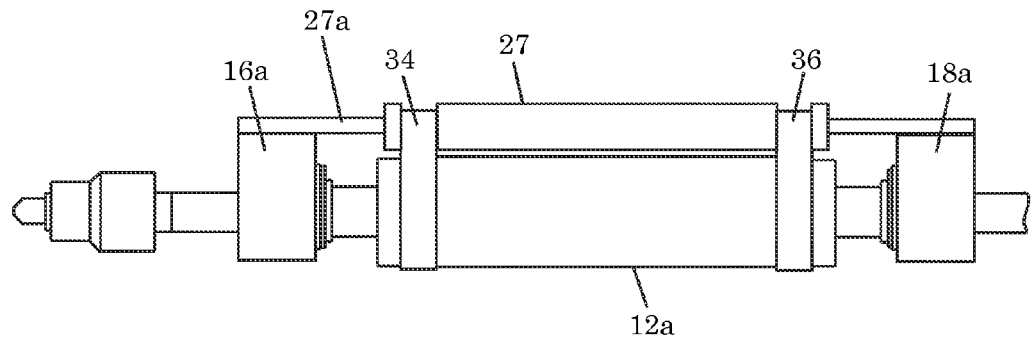
FIG. 6B shows spacer belts passing around an auxiliary roller.

Modifications to the belt guide are also possible. In FIG. 6B, a belt guide in the form of an auxiliary roller 27 is positioned adjacent to the roller 12a. The auxiliary roller 27 may be used in place of the previously described pulleys 26, 28 (in FIG. 1). The auxiliary roller 27 can have the same length as the roller 12a. The auxiliary roller 27 will not need to be rotated by a driver motor. However, the auxiliary roller 27 may be mounted on a shaft 27a and may be free to rotate on the shaft 27a. The auxiliary roller shaft 27a can be coupled at its ends to the bearing blocks 16a, 18a or some other support members that are movable so that when the roller 12a moves to a new position the auxiliary roller 27 can also move. This would allow a desired position of the auxiliary roller 27 relative to the roller 12a to be maintained. At this desired position, the spacer belts 34, 36 would pass around the roller 12a and the auxiliary roller 27. The auxiliary roller 27 may have grooves for receiving the spacer belts 34, 36.

Figure 6C:
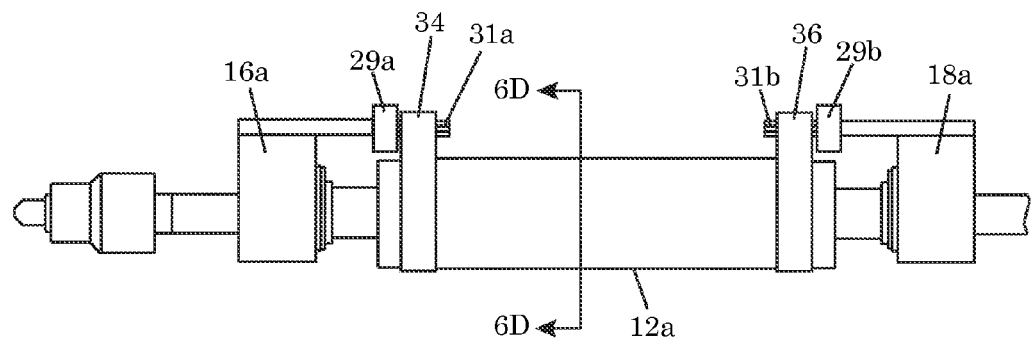
FIG. 6C shows spacer belts passing around guide blocks with roller needles.
Figure 6D:
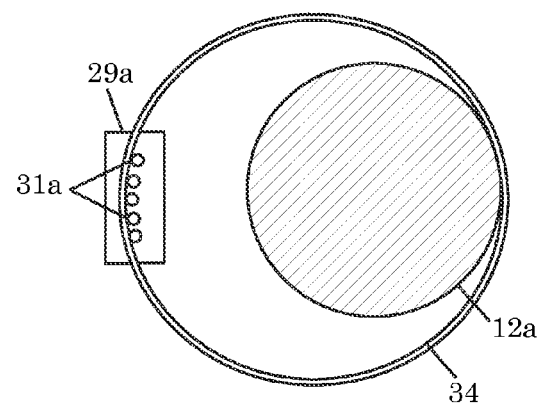
FIG. 6D shows a cross-section of FIG. 6C along line 6D-6D.

In FIG. 6C, a belt guide in the form of a pair of guide blocks 29a, 29b and a set of needle rollers 31a, 31b attached to the guide blocks 29a, 29b is positioned adjacent to the roller 12a. Each set of needle rollers 31a, 31b is arranged along an arc or circular path on the respective one of the guide blocks 29a, 29b (see FIG. 6D). The guide blocks 29a, 29b and needle rollers 31a, 31b may be used in place of the previously described pulleys 26, 28 (in FIGS. 1 and 6A) The guide blocks 29a, 29b can be coupled to the bearing blocks 16a, 18a via any suitable means or to some other support members that are movable so that when the roller 12a moves to a new position the guide blocks 29a, 29b can also move. This would allow a desired position of the guide blocks 29a, 29b relative to the roller 12a to be maintained. At this desired position, the spacer belts 34, 36 would pass over the roller 12a and the needle rollers 31a, 31b on the guide blocks 29a, 29b (see FIG. 6D).

Figure 7A:
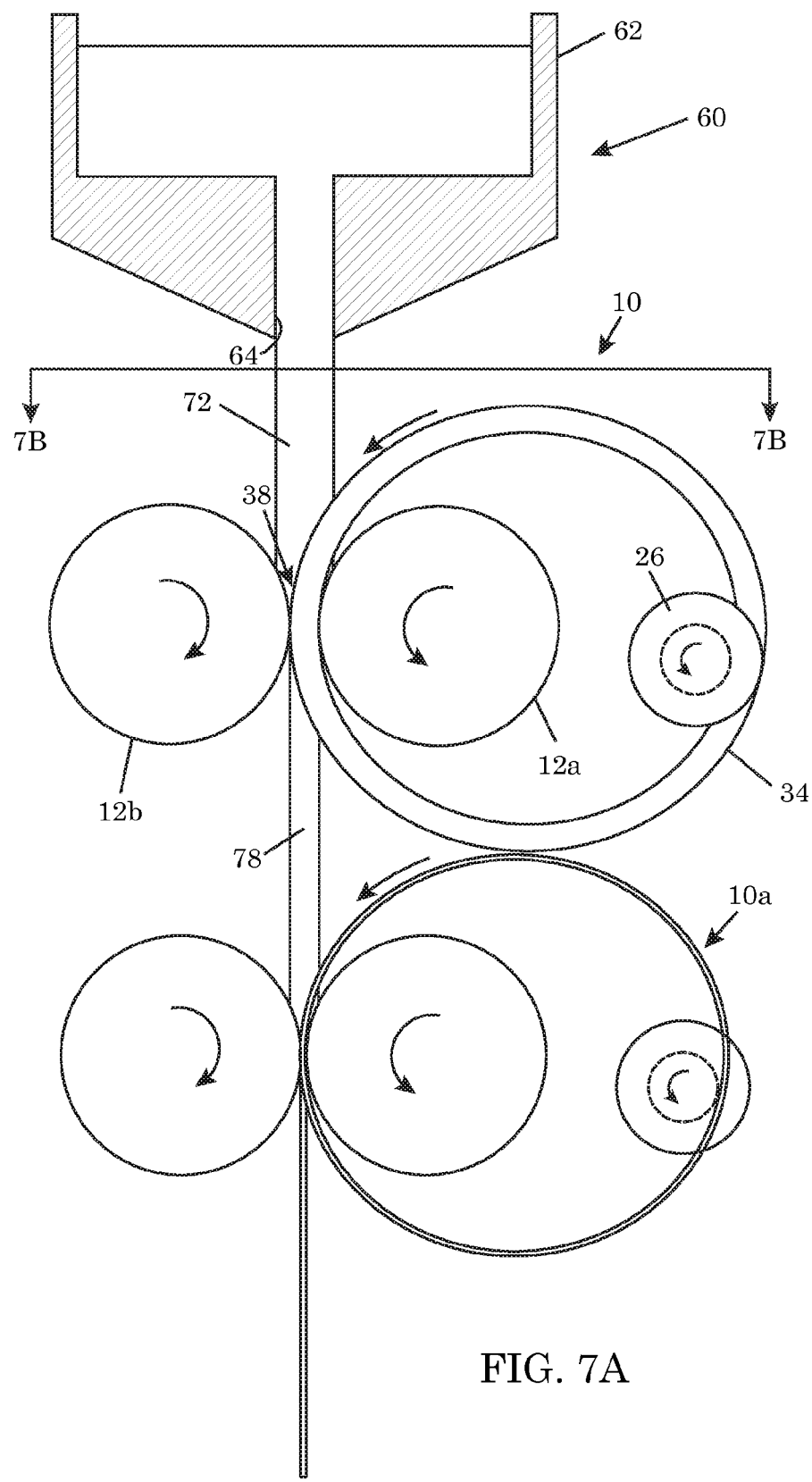
FIG. 7A shows an apparatus for forming sheet glass.
Figure 7B:
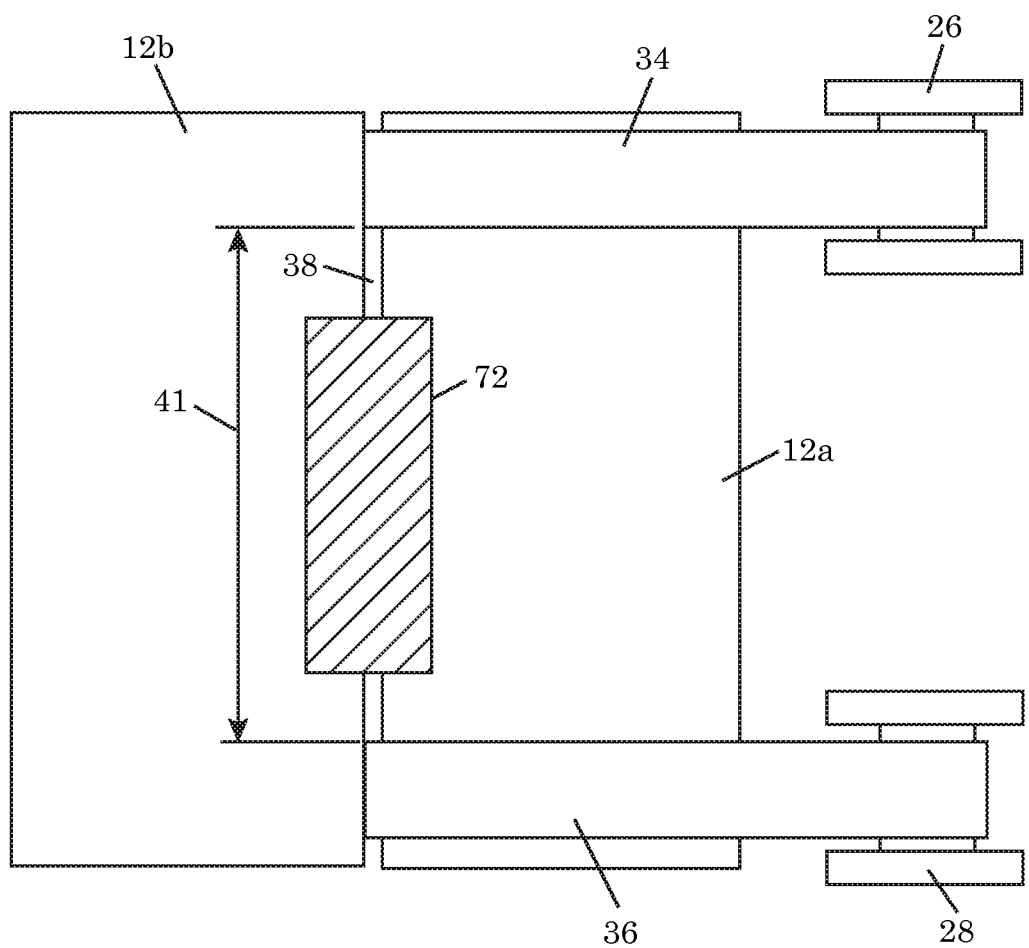
FIG. 7B shows a cross-section of FIG. 7A along line 7B-7B.

FIG. 7A shows an apparatus 60 for forming a sheet glass including the rolling apparatus 10 arranged below a molten material delivery vessel 62. (It should be noted that FIG. 7A is a simplified schematic of the apparatus 60 and that all the details of the rolling apparatus 10, as described above, are not shown in FIG. 7A.) A stream of molten glass 72, exiting through a slot 64 at the bottom of the delivery vessel 62, is fed to the nip gap 38 of the rolling apparatus 10. The stream of molten glass 72 may be in the form of a sheet that is aligned with the nip gap 38. As shown in FIG. 7B, the width of the stream of molten glass 72 is preferably smaller than the nip gap length 41, which would allow contact between the molten glass 72 and the spacer belts 34, 36 to be avoided. The molten glass 72 may be fed to the nip gap 38 while the glass viscosity is in a range from about 200 poise to about 10,000 poise or from about 30 poise to about 10,000 poise. From the stream of molten glass 72 delivered to the nip gap 38, the rolling apparatus 10 produces a precision sheet glass 78 with a select thickness and width, as determined by the characteristics of the nip gap 38 and rotational speed of the rollers 12a, 12b. The apparatus 60 in FIG. 7A can be used for continuous production of sheet glass. The apparatus 60 can also be used for production of other sheet material besides sheet glass. The molten material delivered to the nip gap 38 will determine the type of sheet material produced.

Additional rolling apparatus, which may or may not have the same configuration as the rolling apparatus 10, may be arranged above or below the rolling apparatus 10. Arranged above the rolling apparatus 10, the additional rolling apparatus may produce a sheet glass (or other sheet material) that will be further thinned down by the rolling apparatus 10. Arranged below the rolling apparatus 10, the additional rolling apparatus may further thin down or apply texture to a sheet glass (or other sheet material) produced by the rolling apparatus 10. For illustration purposes, rolling apparatus 10a is shown below the rolling apparatus 10. The rolling apparatus 10a may have the same characteristics as rolling apparatus 10, except that the dimensions of the spacer belts used in the rolling apparatus 10a may differ from those of the spacer belts used in the rolling apparatus 10. In some embodiments, any combination of rolling apparatus used yields a precision sheet glass (or other precision sheet material).

The rolling apparatus 10 is arranged vertically below the delivery vessel 62 in FIG. 7A. However, it is possible for the rolling apparatus 10 to be used in a horizontal or inclined orientation. In these alternate embodiments, a mechanism for transitioning the stream of molten material provided by the delivery vessel 62 to a horizontal or inclined orientation will be needed so that the molten material can be fed into the nip gap formed by the rollers of the horizontal or inclined rolling apparatus.

Various devices may be used inline with the rolling apparatus 10 in the apparatus 60 and variations thereof. For example, a scoring device may be provided downstream of the rolling apparatus 10 to score the sheet material produced by the rolling apparatus 10. For sheet glass, the scoring device may be a mechanical or laser device. A separation device may also be provided downstream of the rolling apparatus 10 to separate the sheet material at the score line. In some cases, the scoring and separation devices may be rolled into a single device. A profile measurement device may also be provided to measure a thickness profile of the sheet material produced by the rolling apparatus. In the case of glass, the rolled sheet material can be transitioned onto transport rollers and transported to an annealing lehr for further processing.

Other types of molten material delivery vessels besides a slot-type delivery vessel may be used to deliver molten material to the nip gap 38 of the rolling apparatus 10. For example, a ladle or crucible may be loaded with molten material and then tipped over the rollers 12a, 12b to deliver the molten material to the nip gap 38. The tipping may be in a controlled manner so that the molten material pours out of the ladle at a desired rate. Or, the ladle may be tipped to quickly dump its contents on the rollers. The molten material will then be drawn down the nip gap 38 by gravity and by the rotating surfaces of the rollers 12a, 12b. Another method of delivery is an isopipe. Molten material may be delivered to the weir of the isopipe and then overflown down opposing sides of the isopipe. The separate streams of molten material will converge at a root of the isopipe into a single stream of the molten material that can be delivered to the nip gap 38.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An apparatus for forming a sheet glass, comprising:
a pair of rollers arranged in opposing relation to form a nip gap, at least one of the rollers being translatable to adjust a width of the nip gap;
a pair of spacer belts passing in between the pair of rollers, the pair of spacer belts being spaced apart along a length of the pair of rollers and having a thickness to set the width of the nip gap;
at least one actuator coupled to at least one of the rollers and operable to adjust the width of the nip gap until the pair of spacer belts is gripped by the pair of rollers and the thickness of the pair of spacer belts sets the width of the nip gap; and
a belt guide disposed adjacent to at least one of the rollers, wherein at least one of the spacer belts passes around one of the rollers and the belt guide.

2. The apparatus of claim 1, wherein the belt guide comprises a pair of pulleys, and wherein each of the spacer belts passes around one of the rollers and one of the pulleys.

3. The apparatus of claim 1, wherein the belt guide comprises an auxiliary roller, and wherein the pair of spacer belts passes around one of the rollers and the auxiliary roller.

4. The apparatus of claim 1, wherein the belt guide comprises a pair of guide blocks and a set of needle rollers attached to each of the guide blocks, and wherein each of the spacer belts passes around one of the rollers and the set of needle rollers attached to one of the guide blocks.

5. The apparatus of claim 4, wherein the set of needle rollers on each guide block is arranged in an arc or circular path on the guide block.

6. The apparatus of claim 1, wherein the thickness of the pair of spacer belts is in a range from 0.1 mm to 4 mm.

7. The apparatus of claim 1, wherein the thickness of the pair of spacer belts is 1 mm or less.

8. The apparatus of claim 1, wherein the thickness of the pair of spacer belts is uniform.

9. The apparatus of claim 1, wherein the thickness of the pair of spacer belts is profiled.

10. The apparatus of claim 1, wherein the pair of spacer belts is made of a metal or an alloy.

11. The apparatus of claim 1, further comprising a pair of motors coupled to the pair of rollers for selectively rotating the rollers.

12. The apparatus of claim 1, further comprising a delivery vessel positioned to deliver molten material to the nip gap.

13. A method of forming a sheet glass, comprising:
arranging a pair of rollers in opposing relation to form a nip gap;
disposing a belt guide adjacent to at least one of the rollers;
passing a pair of spacer belts between the pair of rollers, the passing comprising spacing the pair of spacer belts apart along a length of the pair of rollers;
passing at least one of the spacer belts around the belt guide;
translating at least one of the pair of rollers to adjust a width of the nip gap until the pair of spacer belts is gripped by the pair of rollers and the width of the nip gap is set by a thickness of the pair of spacer belts;
rotating at least one of the rollers; and
delivering molten glass to the nip gap having the width set by the pair of spacer belts to form the sheet glass.

14. The method of claim 13, wherein the passing the pair of spacer belts further comprises passing at least one of the spacer belts around one of the rollers.

* * * * *